Oct. 6, 1959

C. K. STEDMAN 2,907,560

TRANSDUCERS

Filed Jan. 24, 1958

INVENTOR.
CECIL K. STEDMAN
BY Philip Subkow
ATTORNEY

Oct. 6, 1959

C. K. STEDMAN 2,907,560

TRANSDUCERS

Filed Jan. 24, 1958

INVENTOR.
CECIL K. STEDMAN
BY
ATTORNEY

INVENTOR.
CECIL K. STEDMAN
BY
ATTORNEY

Oct. 6, 1959     C. K. STEDMAN     2,907,560
TRANSDUCERS
Filed Jan. 24, 1958     4 Sheets-Sheet 4
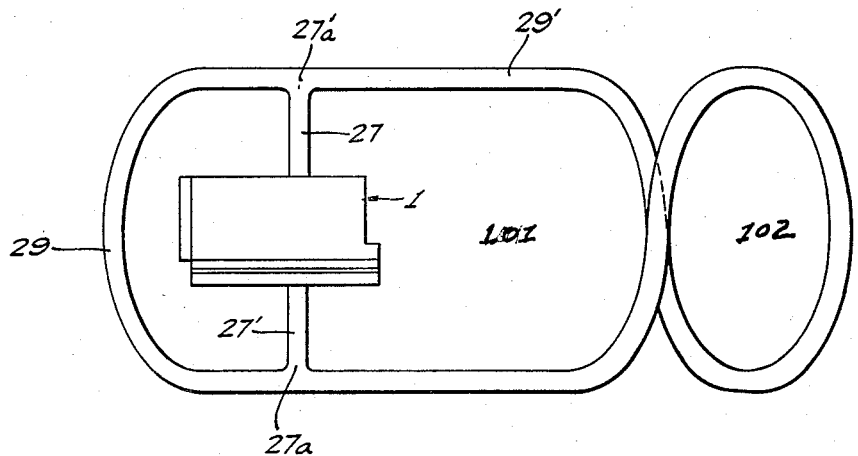
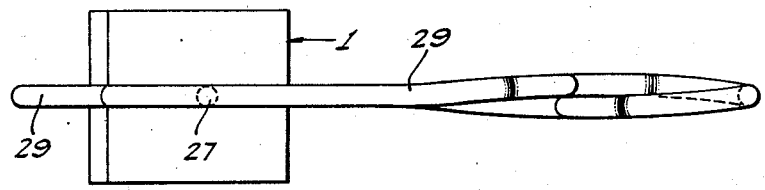
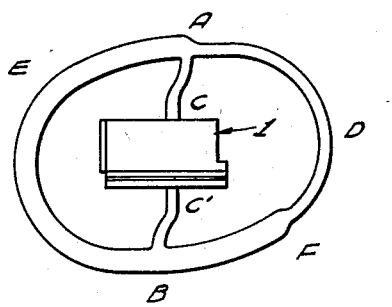
INVENTOR.
CECIL K. STEDMAN
BY
ATTORNEY United States Patent Office 2,907,560
Patented Oct. 6, 1959

2,907,560

TRANSDUCERS

Cecil K. Stedman, Enumclaw, Wash., assignor to Statham Instruments, Inc., Los Angeles, Calif., a corporation of California Application January 24, 1958, Serial No. 711,023

5 Claims. (Cl. 264—1)

This invention relates to transducers such as those which sense force or motion such as, for example, displacement, vibration, velocity or acceleration or some force which causes such motion and in which transducers a body of liquid is employed. The liquid may be used either to transmit or generate a force to which some sensing member in the transducer responds as a measure of the motion or force which the transducer is intended to sense. The liquid may be employed in the transducer to damp the movement of the sensing members where the member is a movable member whose relative motion is employed to sense the force or displacement to which the transducer is subjected.

Thus where in the transducer the liquid can circulate from one side to the other side of a movable member supported in a container, the circulation of the liquid on angular acceleration of the container may create a pressure difference due solely to the angular acceleration of the fluid circulating in the container. This pressure difference may cause a displacement of the member in the same manner as that caused by the force or displacement which the transducer is designed to record and which may have no relation to the accidental angular acceleration to which it has been exposed.

It is an object of my invention to minimize or cancel this pressure difference by constructing the circulating system for the liquid to be in the form of a hydraulic bridge in which the circulation may be directed in paths such that the net pressure differences across the movable member may be made substantially zero or of any desired magnitude.

It is a further object of my invention in such systems to construct the circulatory path in the form of two parallel passageways connected to form a continuous loop. One side of said loop is connected to the liquid containing transducer in such manner that the pressure of the liquid circulating in said loop exerted at the point of connection is imposed on said movable member to urge it to move in a given direction. The other side of the loop is connected to the transducer in such manner that the liquid pressure in said loop, at said other side, is imposed on said movable member to urge it to move in a direction opposite to the said previously mentioned given direction.

It is a further object of my invention to design such system so that on angular acceleration of said system, the liquid will circulate in said loop in such manner that the pressure difference in said liquid pressures resulting from said angular acceleration shall have none or only the desired degree of influence on the displacement of said movable member.

A particularly useful application of my invention is to linear accelerometers in which a solid inertial mass is suspended on a yieldable constraint for oscillatory motion and is immersed in a damping fluid. The damping fluid is caused to move in oscillatory flow through channels on vibration of the solid mass. Such systems so generally described are elementary liquid damped seismic systems commonly used as accelerometers.

Such systems are illustrated, for example, by the accelerometer disclosed in the Statham Patent 2,453,548.

In such prior art systems, where the liquid may flow in channels relative to the case on angular acceleration of the case, from one side of the mass to the other side of the mass, a pressure difference will be imposed on the mass, which will add to the acceleration forces due to the inertia of the mass resulting from such angular acceleration. The instrument will report this force of angular acceleration as if it were due to a linear acceleration. The error introduced by the inertia of the fluid in the circulatory path may make excessive the otherwise acceptable error resulting from the displacement of the mass on angular acceleration.

To minimize the effect of the inertia of the liquid on angular acceleration, I have provided means employing the liquid loop described above whereby the force acting on the solid mass in a direction to displace the solid mass, as a result of the angular acceleration of the liquid, may be reduced to substantially zero, or if desired may be made of the desired order of magnitude, for example, of the same order of magnitude as the displacement caused by the net seismic solid mass.

In the preferred embodiment of my invention, disclosed in this application, as applied to linear accelerometers, this is accomplished by mounting the mass so that it is positioned in an opening in a separating wall, defining two chambers. The mass is suspended in such manner that it responds to and is displaced by any difference in liquid pressure existing in the two chambers.

I connect each of the chambers by means of liquid passageways at spaced points to a circulatory conduit loop so that the liquid pressure at one of said points may be transmitted to one of said chambers and the liquid pressure at the other of said spaced points may be transmitted to the other of said chambers through said liquid passageways.

The loop and connecting liquid passageways may be viewed as a hydraulic bridge of which the passageways form an internal leg and the connecting branches of the loop two parallel external legs of the hydraulic bridge.

Thus, I may use one or more external legs of the hydraulic bridge with the flow in the internal leg in parallel with the flow through the external legs and in the opposite direction on linear acceleration of the system and a circulatory path is provided for fluid flow around and between said external legs on angular acceleration of the system. By a proper design of the external legs I may either cancel out or make of desired magnitude the pressure difference exerted by the liquid circulating in the external paths upon the ends of the internal leg where they are connected to the external legs.

This invention will be further described by reference to the figures, of which:

Fig. 8 is a schematic plan view of a further adaptation of my invention;

Fig. 9 is an end view of Fig. 8; and

Fig. 10 is a modification of the system of Fig. 5.

Figure 1:
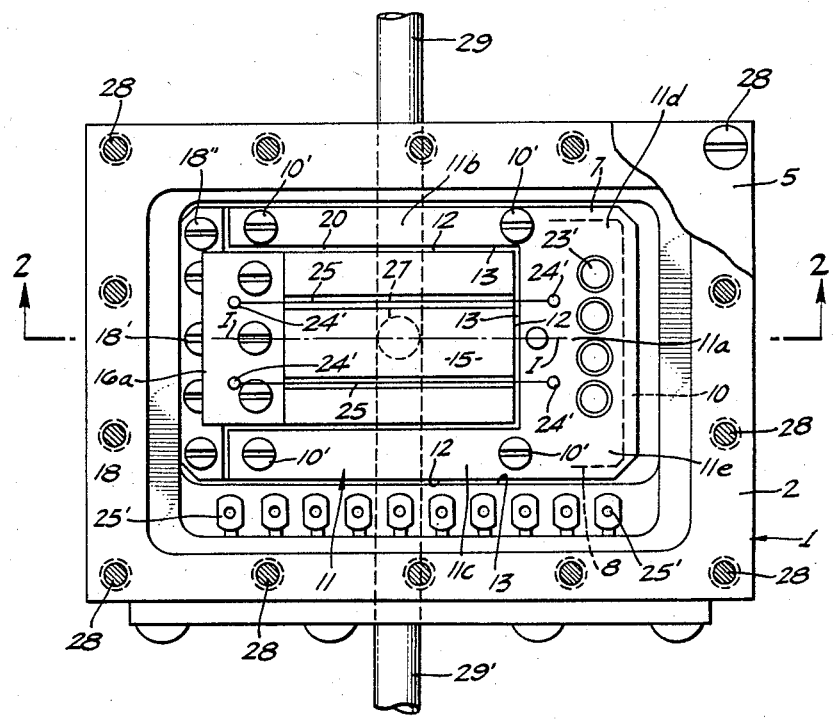
Fig. 1 is a plan view of one form of the linear accelerometer of my invention, which shows an intake tube and an outlet tube on each side of the case for the flow of liquid.
Figure 2:
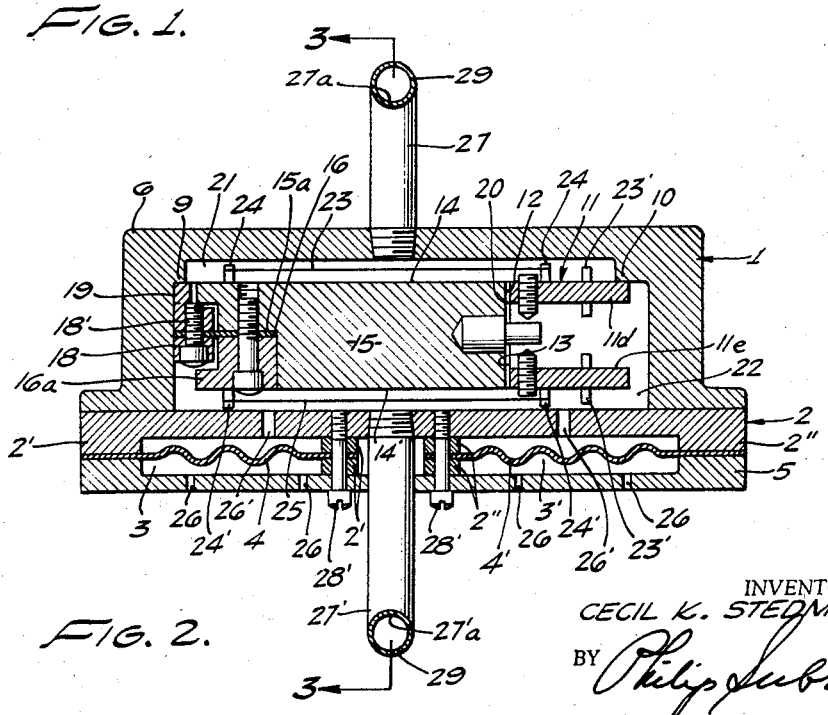
Fig. 2 is a section taken on line 2—2 of Fig. 1.
Figure 3:
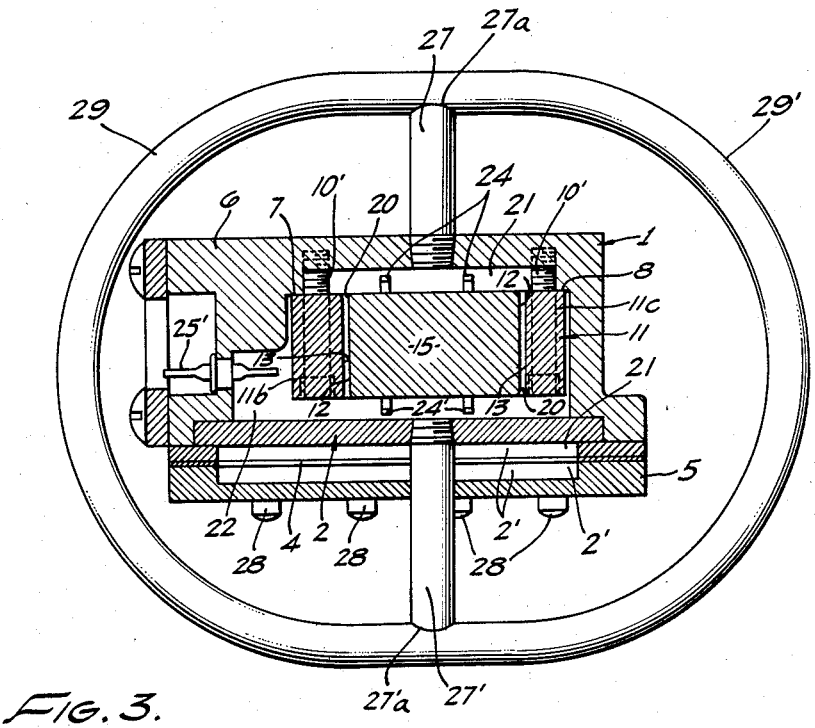
Fig. 3 is a section taken on line 3—3 of Fig. 2.

The accelerometer as shown in Figs. 1 to 3 constitutes modifications of the accelerometer shown in the Statham Patent No. 2,453,548 and varies therefrom in that the frame of the accelerometer is positioned in the case so that the damping liquid in the case cannot circulate freely around the mass and frame from one side of the seismic mass to the other side of the seismic mass, but is directed to flow through the paddle orifice.

In Figs. 1 to 3 the case 1 is covered by a vented cover 2 forming part of diaphragm chambers 3 and 3' formed by chordal clamping bars 2' and 2" and the vented bottom. The segmental flexible diaphragm 4 and 4' is clamped between the bars 2' and the flanged ends of the base 5 and the cover 2 and a segmental flexible diaphragm 4 and 4' is clamped between the flanges of base 5 and cover 2". Suitable vents 26 and 26' are provided for the base 5 and cover 2. The base and cover are connected to the case by bolts 28 and 28'. Internal shoulders 7, 8, 9 and 10 are provided around the four sides of the rectangular case 1. The frame 11 of the accelerometer is composed of a U-shaped frame, having a base 11a and the two legs 11b and 11c (Fig. 1). The base is slotted to provide two lips 11d and 11e, stop screws being provided in these lips (see Fig. 1). It is held against shoulders 7, 8 and 10 by means of screws 10'.

The solid mass 15 is stepped at 15a to receive a spring 16, which is clamped in the step 15a by a clamping block 16a. The other end of the flat spring 16 is clamped by clamping block 18 to clamping block 19 by studs 18' and 18" and is connected to the ends of the legs 11b and 11c by studs. This construction provides a rectangular opening in which the rectangular solid 15 is suspended in the spring 16. The peripheral edges of said solid are spaced from the frame on three sides of the solid, see faces 12 and 13, the fourth being closed by the spring 16, to give a gap 20 between the peripheral edges and the opening in the frame formed by the U-shaped member of uniform width between the mass 15 of the frame 11. This gap forms the orifice referred to above, and for a more particular description may be termed the paddle orifice, since on oscillation of the mass 15 on the spring 16, is has the properties of a suspended paddle.

The frame 10 is sealed on the shoulder 7, 8, 9 and 10 so as to make a tight seal around the entire periphery of the case 1. The case is thus divided into two chambers 21 and 22. The electrical resistance strain wires 23 are positioned in chamber 21 and stretched in tension between pins 24, and the strain wires 25 are positioned in chamber 22 and stretched in tension between the pins 24', and are connected to terminals 23' and 25', as is conventional for such strain wire devices (see the previously mentioned Statham patent).

I provide a flow channel in addition to that through the orifice 20. This auxiliary passageway may be provided, as in Figs. 1 to 3, by the tubes 27 and 27' of uniform cross-section, one connected at its under end centrally of the mass to the chamber 2 and one passing through the space between the clamping bars 2' and 2" and connected at its inner end to the chamber 22, centrally of the mass 15.

The tubes 27 and 27' are connected by a manifold 29 and 29' which provide two parallel circulatory paths connected to the outer ends of tubes 27 and 27'.

The case 1, chambers 21 and 22, tubes 27 and 27', 29 and 29', and the space above the diaphragms 4, are filled with a liquid of desired viscosity, while chambers 3 and 3' are vented to ambient pressure.

The tubes 29 and 29' thus form a loop and the pressure at 27a is communicated to chamber 21 and the pressure at 27'a is transmitted to chamber 22.

It will be also seen in the form of Figs. 1 to 3 that the only liquid communication between the chambers 21 and 22 is via the tubes 27 and 27' and through the peripheral orifice 20 between the periphery of the paddle 15 and the frame.

While the paddle 15 is shown as solid, it may be made hollow to reduce its mass so that the degree of buoyancy may be increased, so that its effective suspended mass may be made as small as desired or may be negative, i.e., less than the mass of the liquid displaced by the solid mass. In like manner the material of the paddle may be chosen so that its density shall have the desired relation to the density of the liquid. Thus it may be made of metal or of non-metallic material of desired density. It may be made hollow to reduce its effective bulk density.

In the structures of Figs. 1 to 3, on linear acceleration of the case, the fluid moves with the case and tubes 27, 27', 29 and 29', and is given a like acceleration. Consequently, no difference in pressure is developed on the opposite sides of the paddle 15 due to accelerated liquid motion through the tubes 27 and 27', and no torque occurs to deflect the paddle 15 as a result of the acceleration of the fluid. If the paddle 15 has residual mass, i.e., if it is not made exactly buoyant, it will deflect on the spring 16. Its range, i.e., the magnitude of its deflection under constant linear acceleration in one direction, is dependent substantially entirely on the inertia of the paddle 15 when immersed in the liquid and upon the stiffness of the constraint on the paddle and independent of the inertia of the liquid.

If the case is subject to change in acceleration as, for example, when subjected to oscillatory linear movement, the paddle 15 will oscillate on its spring suspension, causing movement of fluid relative to the case from one chamber 21 to the other chamber 22. This flow in the device of Figs. 1 to 2 is in series through the tube 27 and 27' and through the paddle orifice 20. The motion of the paddle 15 is thus damped as a result of such fluid motion.

If the case be given any angular acceleration or any combined linear and angular acceleration, the tubes 27, 27', 29 and 29' act to cancel out or minimize the resultant displacement of the mass 15 due to the angular acceleration of the device and thus the device will more faithfully sense the linear acceleration component of the motion than the prior art devices referred to.

Figure 4:
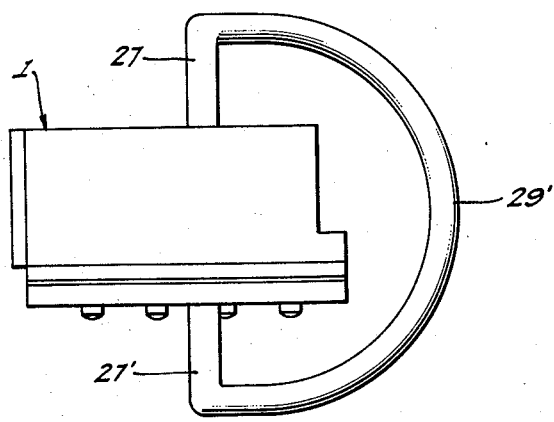
Fig. 4 is a modified form of the accelerometer of Fig. 1.
Figure 5:
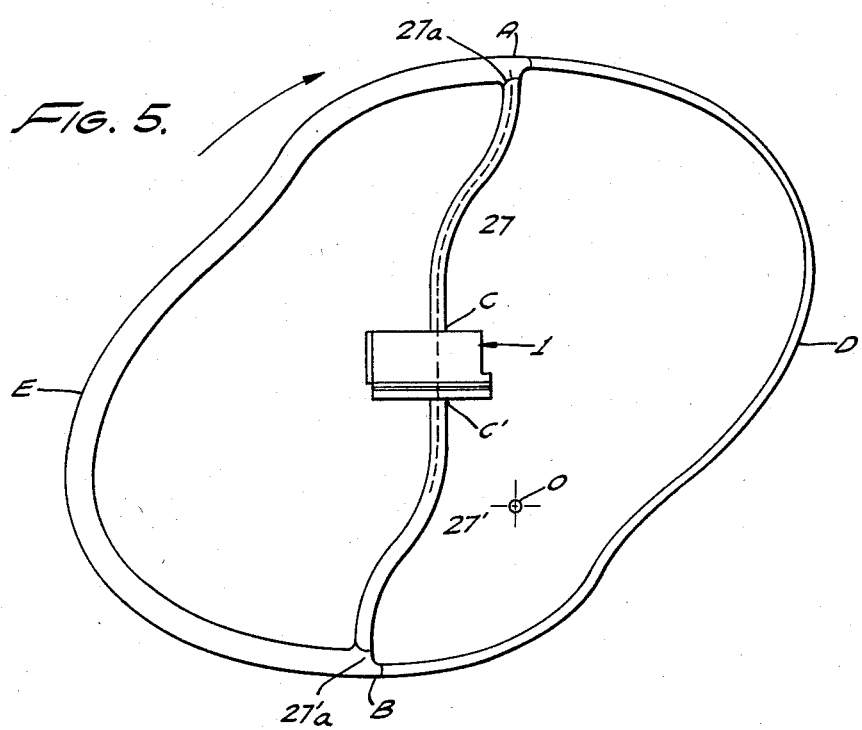
Fig. 5 is a schematic plan view of a system illustrating the principles of my invention.

The principle underlying the hydraulic bridge employed in the above forms of my invention is illustrated by the schematic diagram shown in Figs. 4 and 5. In Fig. 5 is shown a closed loop ADBE, which is shown irregular to indicate that it is a conduit of any desired geometric configuration. The conduit may be tubular or of any other desired cross-sectional configuration. Assume each of the three legs AEB, ADB and ACC'B each to be of uniform cross-sectional character around the loop but not necessarily each of the same cross-sectional area or of the same length. The motion sensing element such as is shown in Figs. 1–3 may be used and is indicated at 1, which together with leg portions AC and BC' form the internal leg AB. Assume the loop is rotated about any arbitrarily chosen axis perpendicular to the plane of the drawing passing, for example, through point O in the direction of the arrow, under a given angular acceleration, which gives a resultant velocity of flow of liquid in the loop relative to the channel ADBE.

Comparing the schematic drawing Figs. 3 and 4 with the form of Figs. 1 to 3, it will be seen that the system ADB corresponds to 27, 28' and 29' and the system AEB is 27, 27' and 29 and the conduit AC—C'B is 27 and 27'. It is apparent that if there is no pressure difference between A and B, no flow will occur in the leg ACC'B and a paddle positioned for deflection in the passageway ACC'B, i.e., paddle 15, on the imposition of such pressure difference will not deflect. Consideration of the hydraulics of this system and of the forces including the radial and tangential acceleration of the tube plus the acceleration of the liquid relative to the tube and the centrifugal forces involved shows that the pressure at A and B will be equal, if the following criteria are satisfied:

If M is the area enclosed by the axis of the passageways ADBC; and

Figure 6:
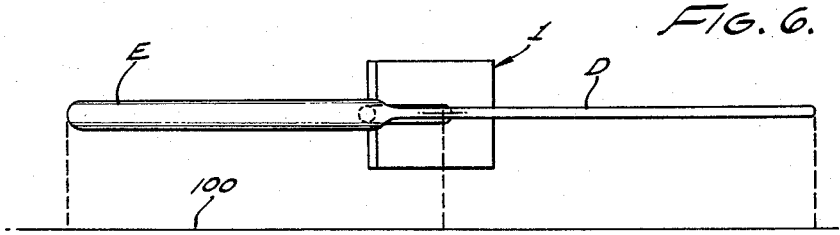
Fig. 6 is a side view of the system of Fig. 5.

M' is the area enclosed by loop AEBC projected on the plane of the drawing which is the plane of rotation of the loop about point O;

It is to be noted that in the form illustrated in Figs. 5 and 6 the axis are all coplanar so that the actual area is equal to the projected area in the plane of rotation. This projected area is hereafter referred to as the included area of the external leg referred to, i.e., ACC'BE or ACC'BD preferably.

N is the cross-sectional area of the section of the loop from A to D to B, all of uniform cross-sectional area;

N' is the cross-sectional area of the section of the loop from A to E to B, all of uniform and sectional area;

L is the length of the section of the loop from A to D to B, measured along the axis;

L' is the length of the section of the loop from A to E to B, measured along its axis;

Then there will be no pressure difference between A and B if $$\frac{M}{M'} = \frac{LN'}{NL'} \qquad (Eq. 1)$$

When in the forms of Figs. 1-3, each of the external legs are of equal geometry (i.e., length and cross-sectional area) so that the flow in the external leg divides equally between the two external legs, the above relationship requires only that the projected areas be equal.

My invention is also not limited to tubes of uniform cross-section. For example, the tube ADB in Fig. 4 may, as in Fig. 10, be divided into two portions AF of length P and cross-sectional area Q and the other FB of length R and cross-sectional area S. I have found that the condition for zero flow in tubes AC, C'B on angular acceleration of the device becomes $$\frac{M}{M'} = \left(\frac{P}{Q} + \frac{R}{S}\right)\left(\frac{N'}{L'}\right)$$

$$\frac{M}{M'} = \frac{PN'}{QL'} + \frac{RN'}{SL'} \qquad (Eq. 2)$$

It will be observed from the Equations 1 and 2 that the condition for establishing no pressure difference between A and B is independent of the nature of the conduit AC and C'B, or any transducer in such internal leg, such as shown at 1, in Figs. 5 through 10. This is particularly true since if no flow occurs in conduits AC or C'B, the transducer will not be affected. In transducers depending on or influenced by liquid flow, the liquid flow significant for the functioning of the transducer will not be adversely affected by angular acceleration since no flow will thus occur in the conduits AC or C'B.

Thus it is not necessary that communication between the two chambers must exist inside the container and the mass 15 need not be positioned as a paddle but may be mounted on a flexible diaphragm which closes the opening in the frame.

Figure 7:
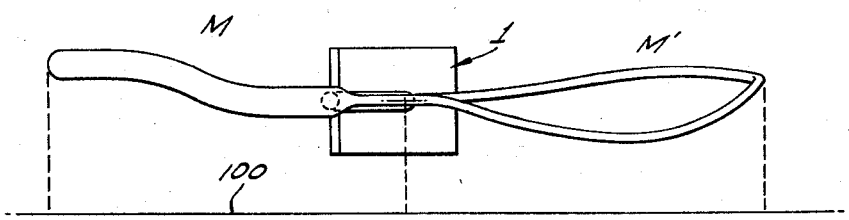
Fig. 7 is a side view of a form similar to Fig. 5 illustrating a non-planar axial orientation.

The above derivation may be generalized to three dimensions, i.e., the loop need not be planar. In such case the areas M and M' are the projected areas in a plane perpendicular to the axis of rotation, for example, through O. Thus the loops may be skewed having axes which are not coplanar as illustrated in Fig. 7. In such case the included area is the projected area on the plane of rotation, i.e., the plane of the paper when the axis of rotation is the same as in Fig. 5. This plane is shown at 100 on Fig. 7. Thus, if the leg ADB or AEB are helixes of n turns, the helix has an effective area of n times one turn. The sign of the areas must be taken into account. If one or both loops are a figure 8 (see Figs. 8 and 9) the projected area of the figure 8 loop is taken on the plane of the paper still assuming the axis of rotation to be as in Fig 5, and the net area of the external leg represented by the leg composed of the loops 101 and 102, will be the difference between the included areas of 101 and 102 provided that the included area of 101 is greater than that of 102.

It will be understood by those skilled in this art that the system which I have invented for balancing flow due to angular accelerations can be applied to many other configurations of tubes providing the appropriate relationships among projected areas, lengths and sectional areas of the tubes.

The above considerations give the conditions for bridge balance, i.e., where no pressure difference occurs between A and B (Fig. 4) or across the orifice 20. The following considerations indicate the degree of unbalance which is tolerable. If the included areas are not equal, the resultant unbalance of flow will result in a sensitivity to angular acceleration ($a'$) caused by a force F and give a paddle deflection ($x'$) due to the resultant pressure difference (across the orifice 20 in Figs. 1-3, or at A and B in Fig. 5).

If $s$ is the area of the equal top and bottom surfaces 14 and 14' of the mass 15 and T is the length of the mass measured along its axis I—I', $d$ is the density of the liquid, K is the moment of torsion of the spring 16, $a'$ is the above acceleration, and M" is the difference of the projected included areas the above flow paths in the external legs, i.e., $M'' = M - M'$, then $$M'' = \frac{2Kx'}{dsT^2a'} \qquad (Eq. 3)$$

Since, also the mass 15, due to the fact that it is hinged at one end, is also sensitive to angular acceleration, it will also respond to the angular acceleration ($a'$), and this will add to the deflection. Let us call this component of the deflection $x''$.

This component of the total deflection is determined as follows:

$$x'' = \tfrac{1}{3} mT^2 a' \qquad (Eq. 4)$$

where $m$ is the buoyant mass of the paddle 15. This is the value of the deflection on angular acceleration which is produced by the mass $m$ in addition to the deflection resulting from the circulation of the fluid. This is thus the minimum error, ignoring any resulting from liquid circulation, introduced on angular acceleration of the case and depends on the dimensions of the mass suspended in the liquid.

One may set the value of $x'$ as zero or as any fraction or multiple of $x''$ and thus predetermine the added error in deflection resulting from the circulation of the fluid by setting the value of M" either at zero or any desired greater value. Since one can also make $x'$ of negative value and equal to $x''$, the net deflection due to angular acceleration may be made zero. Thus, for example, where it is permissible that $x' = x''$, so that the total error due to angular acceleration be twice the error resulting from the paddle mass;

$$M'' = \tfrac{2}{3}\frac{mT}{sd}$$

Thus, if the value of M" is made equal to the projected area of one of the external legs, for example, 29 or 29' or ACC'BD or ACC'BE, then I may omit the other of said external legs and obtain a deflection on angular acceleration within the permissible limit. This is illustrated by Fig. 4 in which the device of Figs. 1-3 is modified by omitting the leg 29. In this case the included area with the areas of 27, 27' and 29' is made substantially equal to M".

This application is a continuation-in-part of application Serial No. 637,750, filed February 1, 1957.

While I have described particular embodiments of my invention for the purpose of illustration, it should be understood that various modifications and adaptations thereof may be made within the spirit of the invention as set forth in the appended claims.

I claim:

1. A motion sensing device, comprising a case, a movable member having mass mounted in said case, a flexible constraint connected to said member and said case, liquid in said case, said member immersed in said liquid in said case, means separating said case into a plurality of chambers, flow passageways connected to each of said chambers at one end of each of said passageways, a circulatory flow passageway connected to the other ends of each of said first mentioned flow passageways, whereby said liquid in said chambers flows relative to said passageways in circulatory flow in said circulatory flow passageways on angular acceleration of said motion sensing device, said first named passageways forming the interior leg of an hydraulic bridge and each of the said portions of the said circulatory flow passageways connecting the exterior ends of said first named passageways, each forming an exterior leg of said hydraulic bridge, one of said exterior legs and said interior leg forming one branch of said bridge, and the other of said exterior legs and said interior leg forming another branch of said bridge, in which the included area M of said one branch is related to the included area M' of said other branch, and the cross-sectional area N and the length L of said exterior leg of said one branch and the cross-sectional area N' and length L' of said external leg of said other branch are related as $$\frac{M}{M'} = \frac{LN'}{NL'}$$

and means to sense the movement of said member on said constraint.

2. A motion sensing device, comprising a case, a movable member having mass mounted in said case, a flexible constraint connected to said member and said case, liquid in said case, said member immersed in said liquid in said case, means separating said case into a plurality of chambers, flow passageways connected to each of said chambers at one end of each of said passageways, a circulatory flow passageway connected to the other end of each of said first mentioned flow passageways, said first mentioned passageways being connected at one end to said case and to each of said chambers, each of said passageways extending from said case to the other end of said first mentioned passageways positioned exteriorly of said case, said circulatory flow passageways connecting said exterior ends of said first mentioned passageways.

3. A motion sensing device comprising a case, a barrier wall in said case forming two spaced chambers separated by said barrier wall, an opening in said barrier wall, a paddle in said case positioned in said opening, a second opening in said case opposite to said paddle, a hinge connected to said paddle and said case, the peripheral edge of said paddle being spaced from said wall to form a paddle orifice, said paddle orifice providing a liquid passageway from one of said chambers to the other of said chambers, a pair of auxiliary passageways, each of said auxiliary passageways connected at one end thereof to one of said openings in said chambers, a circulatory liquid passageway connecting the other end of each of said auxiliary passageways.

4. In the device of claim 3 in which said circulatory flow passageway is a loop and said other ends of said auxiliary passageways are connected to spaced points in said loop.

5. A motion sensing device comprising a case, a barrier wall in said case forming two spaced chambers separated by said barrier wall, an opening in said barrier wall, a paddle in said case positioned in said opening, a second opening in said case opposite to said paddle, a hinge connected to said paddle and said case, the peripheral edge of said paddle being spaced from said wall to form a paddle orifice, said paddle orifice providing a liquid passageway from one of said chambers to the other of said chambers, a pair of auxiliary passageways, each of said auxiliary passageways connected at one end thereof to one of said openings in said chambers, a circulatory liquid passageway connecting the other end of each of said auxiliary passageways, said passageways forming a liquid loop, the portion of said loop on one side of said loop between said points of connection and said auxiliary passageways forms one branch of an hydraulic bridge, and the portion of the loop on the other side and between said points of connection and said auxiliary passageways forms a second branch of said hydraulic bridge, in which the included area M of said branch and the length L and cross-sectional area N of said first portion of said loop and the included area M' of the other branch of said hydraulic bridge and the length L' and the cross-sectional area N' of said second mentioned portion of said loop are related as $$\frac{M}{M'} = \frac{LN'}{NL'}$$

References Cited in the file of this patent

UNITED STATES PATENTS 2,760,037     Statham     Aug. 21, 1956